(12) United States Patent
Arnold et al.

(10) Patent No.: US 7,921,719 B2
(45) Date of Patent: Apr. 12, 2011

(54) METHOD AND APPARATUS FOR STORING VACUUM GAUGE CALIBRATION PARAMETERS AND MEASUREMENT DATA ON A VACUUM GAUGE STRUCTURE

(75) Inventors: Paul C. Arnold, Boulder, CO (US); Larry K. Carmichael, Platteville, CO (US); Paul M. Rutt, Longmont, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 593 days.

(21) Appl. No.: 11/820,629

(22) Filed: Jun. 20, 2007

(65) Prior Publication Data
US 2007/0251293 A1 Nov. 1, 2007

Related U.S. Application Data

(62) Division of application No. 11/012,871, filed on Dec. 14, 2004, now Pat. No. 7,313,966.

(51) Int. Cl.
*G01L 7/00* (2006.01)
(52) U.S. Cl. .............................. 73/700; 73/712; 73/715
(58) Field of Classification Search .................. None
See application file for complete search history.

(56) References Cited

U.S. PATENT DOCUMENTS

| | | | |
|---|---|---|---|
| 4,237,900 A | 12/1980 | Schulman et al. | |
| 4,284,892 A | 8/1981 | Hulot et al. | |
| 4,481,804 A | 11/1984 | Eberhard et al. | |
| 4,652,752 A * | 3/1987 | Ino et al. | 250/281 |
| 4,691,167 A | 9/1987 | Vlekkert et al. | |
| 4,755,669 A | 7/1988 | Grant et al. | |
| 4,866,640 A * | 9/1989 | Morrison Jr. | 702/98 |
| 5,088,314 A | 2/1992 | Takashi | |
| 5,185,709 A | 2/1993 | Johnson et al. | |
| 5,250,906 A | 10/1993 | Bills et al. | |
| 5,296,817 A | 3/1994 | Bills et al. | |

(Continued)

FOREIGN PATENT DOCUMENTS

| | | |
|---|---|---|
| DE | 198 60 500 A1 | 7/2000 |
| JP | 2004-163136 | 6/2004 |
| JP | 2004163136 A * | 6/2004 |

OTHER PUBLICATIONS

Teledyne Hastings Instruments, Model IGE-3000 [online], Apr. 2005 [retrieved on Jun. 3, 2005] Retrieved from the Internet, URL<http://www.hastingsinst.com/pdfs/IGE-3000%20072903.pdf.

(Continued)

*Primary Examiner* — Lisa M Caputo
*Assistant Examiner* — Jermaine Jenkins
(74) *Attorney, Agent, or Firm* — Hamilton, Brook, Smith & Reynolds, P.C.

(57) ABSTRACT

A method and apparatus for measuring gas pressure by combining an ionization gauge with at least one other vacuum sensor. Nonvolatile memory coupled to the vacuum gauge contains calibration parameters unique to each individual sensor based on factory calibration. The nonvolatile memory may contain calibration parameters for a heat-sensitive vacuum sensor to compensate for the temperature gradients generated by the ionization gauge. The calibration parameters are a function of calibration data determined when the ionization gauge is both on and off. The nonvolatile memory may store a window of measurement data of the vacuum gauge that is updated at predetermined time intervals and in response to an event, such as an error event, to aid in investigating the cause of vacuum gauge malfunction or failure.

30 Claims, 7 Drawing Sheets

U.S. PATENT DOCUMENTS

| | | | |
|---|---|---|---|
| 5,377,128 | A | 12/1994 | McBean |
| 5,422,573 | A | 6/1995 | Bills et al. |
| 5,557,972 | A | 9/1996 | Jacobs et al. |
| 5,583,297 | A | 12/1996 | Stocker et al. |
| 5,831,851 | A * | 11/1998 | Eastburn et al. ............. 700/114 |
| 5,857,777 | A | 1/1999 | Schuh |
| 5,918,194 | A | 6/1999 | Banaska et al. |
| 5,940,780 | A | 8/1999 | Azar et al. |
| 6,470,295 | B1 | 10/2002 | Mirow et al. |
| 6,515,482 | B2 | 2/2003 | Kawasaki |
| 6,658,941 | B1 | 12/2003 | Bills et al. |
| 6,672,171 | B2 | 1/2004 | Gu et al. |
| 6,756,785 | B2 | 6/2004 | Peacock et al. |
| 6,909,975 | B2 | 6/2005 | Dozoretz et al. |
| 7,076,920 | B2 | 7/2006 | Holcomb et al. |
| 7,207,224 | B2 * | 4/2007 | Rutt et al. ....................... 73/714 |
| 2006/0113322 | A1 * | 6/2006 | Maser et al. ............... 222/129.1 |

OTHER PUBLICATIONS

Teledyne Hastings Instruments, HPM-2002-OBE Vacuum Gauge Instruction Manual [online], Jun. 2004 [retrieved on Jun. 3, 2009]. Retrieved from the Internet<URL:http://www.hastings-inst.com/Manual/Vacuum/155_062004_HPM-2002-0BE.pdf>.

Teledyne Hastings Instruments, Model 2002: Dual Sensor Vacuum Gauge [online], Apr. 2005 [retrieved Jun. 3, 2005] Retrieved from the Internet <URL:http://www.hastings-inst.com/pdfs/2002.pdf.

Teledyne Hastings Instruments, OBE: Dual Sensor Vacuum Gauge [online], Apr. 2005 [retrieved Jun. 3, 2005]. Retrieved from the Internet <URL:http://www.hastings-inst.com/pdfs/OBE_2002.pdf.

English, J., et al., "A Wide Range Constant-Resistance Pirani Gauge with Ambient Temperature Compensation," *J. Sci. Instrum.*, vol. 42, No. 2, pp. 77-80 (1965).

Billmayer, H., Ausgewählte Meßprinzipien zur Messung von Absolut-und Differenzdrücken von Gasen, *Messen Prüfen Automatisieren*, vol. 27, No. 5, pp. 216-223 (1991).

Dozoretz, et al., "Shrinking the Pirani Vacuum Gauge," *Sensors: Your Technical Resource for Sensing, Communications, and Control* (Jan. 2005).

"INFICON Product Release: TripleGauge BCG450," 1 page (Jun. 2003).

* cited by examiner

METHOD AND APPARATUS FOR STORING VACUUM GAUGE CALIBRATION PARAMETERS AND MEASUREMENT DATA ON A VACUUM GAUGE STRUCTURE

RELATED APPLICATION(S)

This application is a divisional of U.S. application Ser. No. 11/012,871, filed Dec. 14, 2004 now U.S. Pat. Ser. No. 7,313, 966. The entire teachings of the above application(s) are incorporated herein by reference.

BACKGROUND OF THE INVENTION

Combination vacuum gauges are composed of multiple vacuum sensors each of which uses a distinct physical means for determining the vacuum within the gauge or the chamber connected to the gauge. Combination vacuum gauges allow users to measure a wider range of pressures than vacuum gauges having only a single sensor because combination gauges use different sensor types having different vacuum measurement ranges that overlap. The combination vacuum gauge outputs may be blended in associated control electronics that may be mounted to the gauge assembly or linked to the gauge assembly by a cable.

Since combination vacuum gauges have more than one physical means for measuring vacuum, different correction factors are required for each of the vacuum sensors to get accurate vacuum measurements. These correction factors depend on and vary with such things as pressure, gauge operation parameters, temperature, gas species and which sensors are operating.

It has been a common practice to calibrate sensors on the combination vacuum gauge with generic correction factors. However, such calibration practices produce inaccurate vacuum measurements because even sensors that are of the same type require different correction factors since all sensors are not identical. These measurement inaccuracies are particularly pronounced when measurements from two sensors overlap in a given pressure range and their measurement signals combine into a blended output signal. As a result, correction factors unique to each individual sensor of the combination vacuum gauge have been determined at the factory and provided through a memory module that can be plugged into the controller electronics. In this way the combination vacuum gauge is field replaceable with the memory module.

SUMMARY OF THE INVENTION

In a combination vacuum gauge, inaccuracies in vacuum measurements also arise when the correction factors do not account for the interaction between vacuum sensors. For example, many combination vacuum gauges may include an ionization gauge for measuring a lower range of vacuum measurements and a heat-loss sensor for measuring a higher range of vacuum measurements. A significant source of temperature variation in a combination vacuum gauge is the heat generated by the ionization gauge filament. The ionization gauge is in close proximity with the heat-loss sensor and thus the heat-loss sensor interacts thermally with the ionization gauge in a way that is unique to each combination vacuum gauge because of the slight manufacturing tolerances, material variations, and thermal variations due to the different vacuum fittings. Because the combination vacuum gauge is hottest near the ionization gauge filament, there are temperature gradients that affect the heat-loss sensor temperature compensating equations and that are not present when the combination vacuum gauge is factory calibrated at varying temperatures in an oven.

To overcome the adverse effects of temperature gradients on a heat-sensitive sensor, such as a heat-loss sensor, caused by the ionization gauge, a method and apparatus are provided having nonvolatile memory coupled to the heat-sensitive sensor which contains temperature compensating calibration parameters of the heat-sensitive sensor based on calibration data taken with the ionization gauge both on and off. The calibration parameters are applied to measurement data output from the heat-sensitive sensor. The nonvolatile memory can be integral to the ionization gauge and the heat-sensitive sensor or a controller coupled to the combination vacuum gauge. The controller turns the ionization gauge on in response to output of the heat-sensitive sensor.

In practice, many vacuum gauges, such as combination vacuum gauges, operate for many hours in harsh environments which may cause the gauges to either malfunction or fail. When a vacuum gauge malfunctions (e.g., unstable calibration) or fails, the user typically returns the vacuum gauge to the manufacturer with nothing more than a note stating that the vacuum gauge is "broken" or "doesn't work". As a result, the manufacturer has difficulty determining the cause of malfunction or failure because, for example, the physical combination vacuum gauge itself does not indicate whether the gauge had overheated or which electrode was in operation when the gauge failed. Thus, it is difficult for the manufacturer to repair or correct for vacuum gauge malfunction or failure without knowledge of the vacuum gauge operating conditions before and at the time of the malfunction or failure.

Nonvolatile memory coupled to the vacuum gauge may be used to store measurement data from the vacuum sensors to determine the reasons for malfunction or failure. The vacuum gauge may comprise an ionization gauge, a heat-loss sensor, and a diaphragm sensor. The measurement data stored is unique to the vacuum sensors used. The measurement data of the ionization gauge may include filament emission current and ion current. The measurement data of the heat-loss sensor may include sensed electrical parameters of the heat-loss sensor. Finally, the measurement data of the diaphragm sensor may include an output from an electronic circuit of the diaphragm sensor. The nonvolatile memory may be updated with measurement data, such as a window of measurement data, at predetermined time intervals and in response to an event, such as an error event.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of example embodiments of the invention follows.

Figure 1:
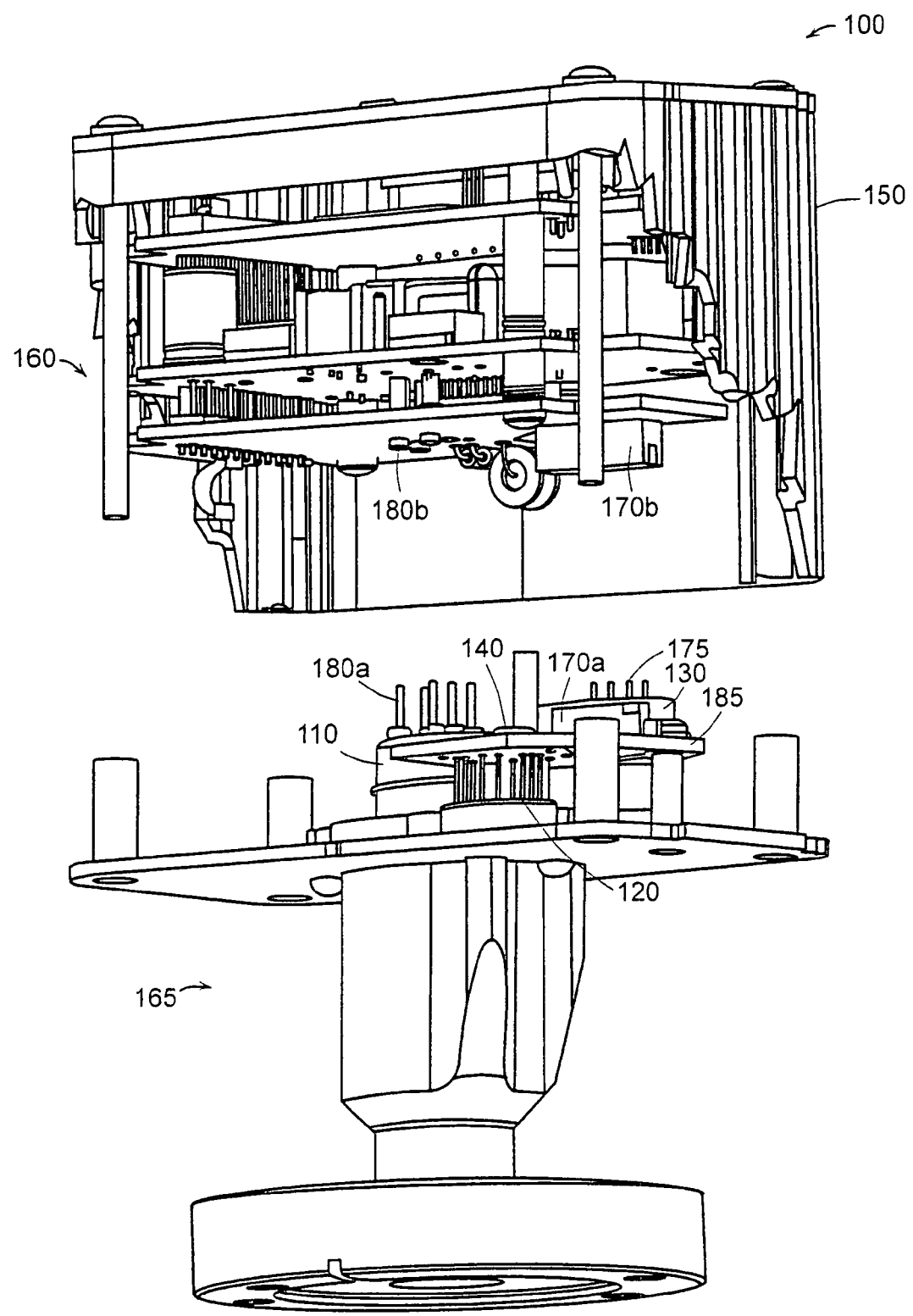
FIG. 1 is a perspective view of a combination vacuum gauge of the present invention separated from the control electronics and cover, with the cover partially broken away.

Referring to FIG. 1, a combination vacuum gauge system 100 in accordance with the present invention comprises a combination vacuum gauge 165 and controller electronics 160. The combination vacuum gauge 165 comprises an ionization gauge 110, a heat-loss sensor 120, a diaphragm sensor 130, and nonvolatile memory 140. The ionization gauge 110 electrically connects to the controller electronics 160 through pins 180a and sockets 180b. The heat-loss sensor 120 and the nonvolatile memory 140 are connected to a combination vacuum gauge circuit board 185 which connects to the controller electronics 160 through connectors 170a and 170b. The diaphragm sensor130 electrically connects to the controller electronics 160 through pins 175 and a flex cable (not shown) to the connectors 170a and 170b. The controller electronics 160, when connected to the combination vacuum gauge 165, are enclosed within a housing 150.

Figure 2A:
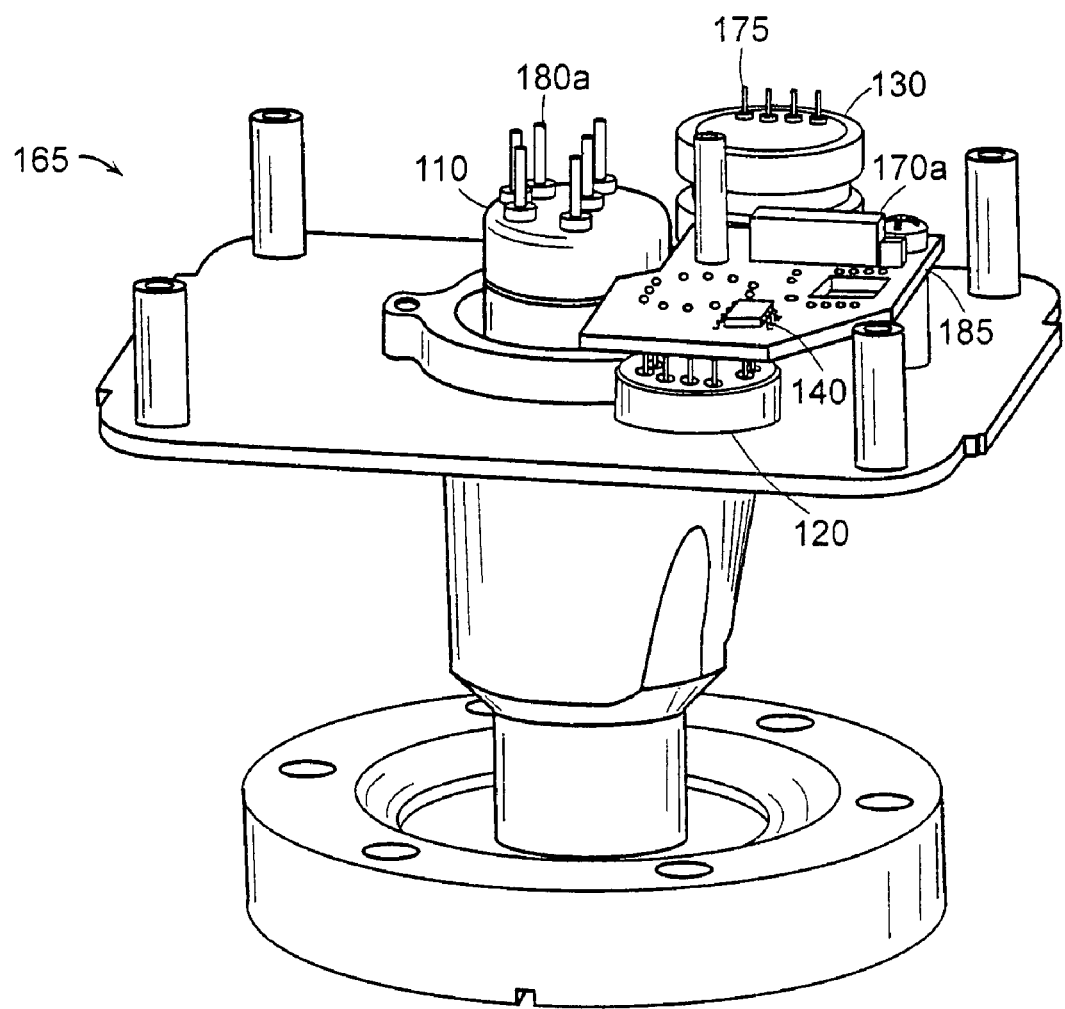
FIG. 2A is a perspective view of a combination vacuum gauge.

FIG. 2A shows a perspective view of the combination vacuum gauge 165 comprising the ionization gauge 110 having six pins 180a, the diaphragm sensor 130 having four pins 175, the heat-loss sensor 120, the nonvolatile memory 140, and the combination vacuum gauge circuit board 185 having the connector 170a. In another embodiment, nonvolatile memory 140 may be permanently affixed to each of the vacuum sensors 110-130. The nonvolatile memory 140 may be any Non-Volatile Random Access Memory (NVRAM) such as Electrically Erasable Programmable Read-Only Memory (EEPROM).

Figure 5:
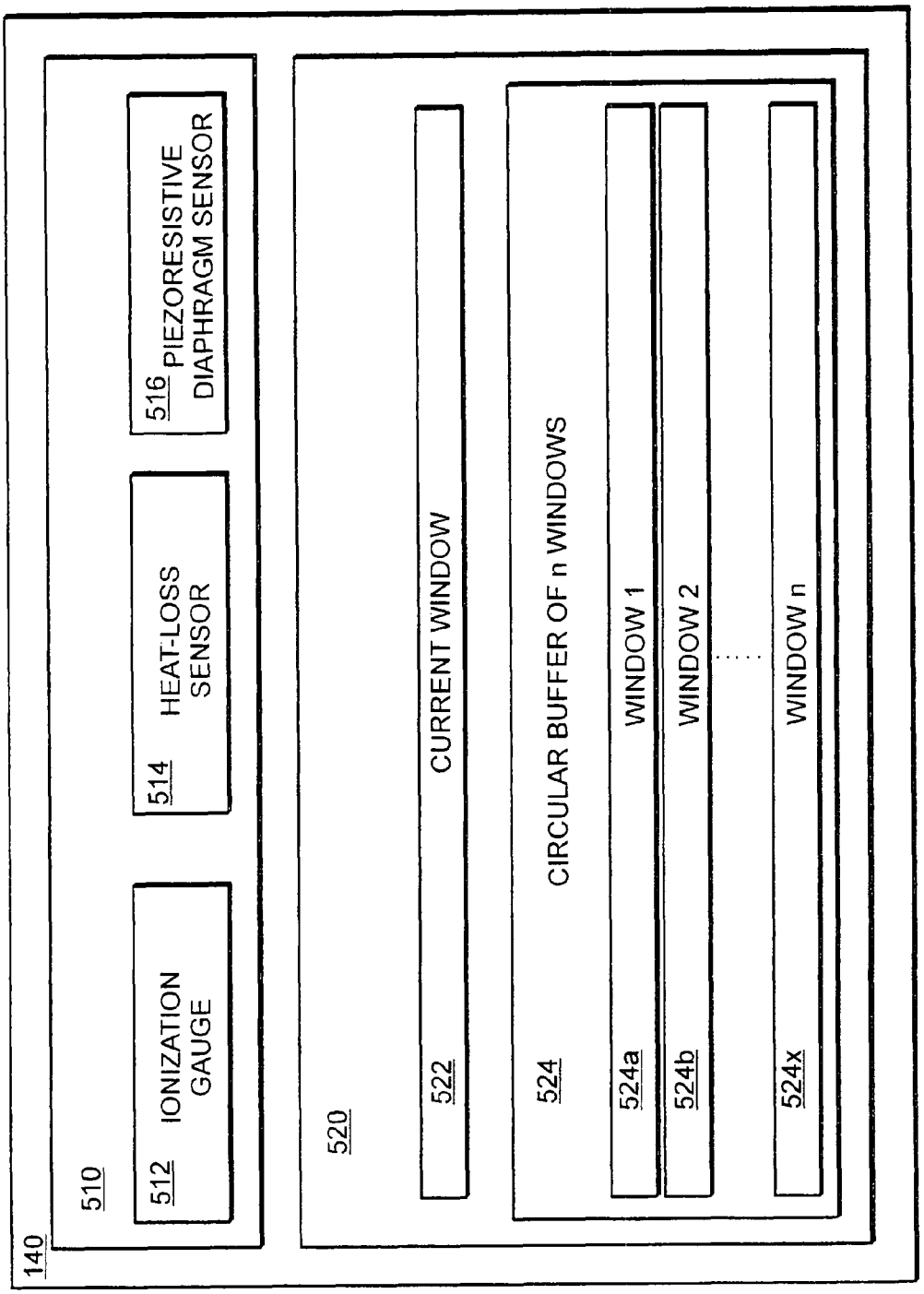
FIG. 5 is a block diagram of the information stored in nonvolatile memory coupled to the vacuum gauge.

The nonvolatile memory 140 may contain calibration parameters unique to each of the vacuum sensors 110-130. The calibration parameters may be determined based on factory calibration of each of the individual vacuum sensors 110-130. As shown in FIG. 5, the calibration parameters for the ionization gauge, the heat-loss sensor, and the piezoresistive diaphragm sensor may be stored at locations 512, 514, and 516, respectively, in the nonvolatile memory 140. Gauge manufacturing information may also be loaded in the nonvolatile memory 140 at the time of manufacture including part number, serial number, revision codes, manufacturing date, serial number and revision codes of calibration equipment and software, and gauge construction configuration (e.g., material options, style, and filament quantity). The nonvolatile memory 140 may also store application history data as described further below.

By storing the calibration and history data on the combination vacuum gauge 165 rather than in the controller electronics 160, the combination vacuum gauge 165 can be replaced in the field without replacement of the controller electronics 160. The history data can be read at the factory in the repair process, and a new replacement combination vacuum gauge 165 carries its individual factory calibration data. An alternative approach is to plug the nonvolatile memory 140 into the controller electronics 160 but to replace that memory as the combination vacuum gauge is replaced.

Figure 2B:
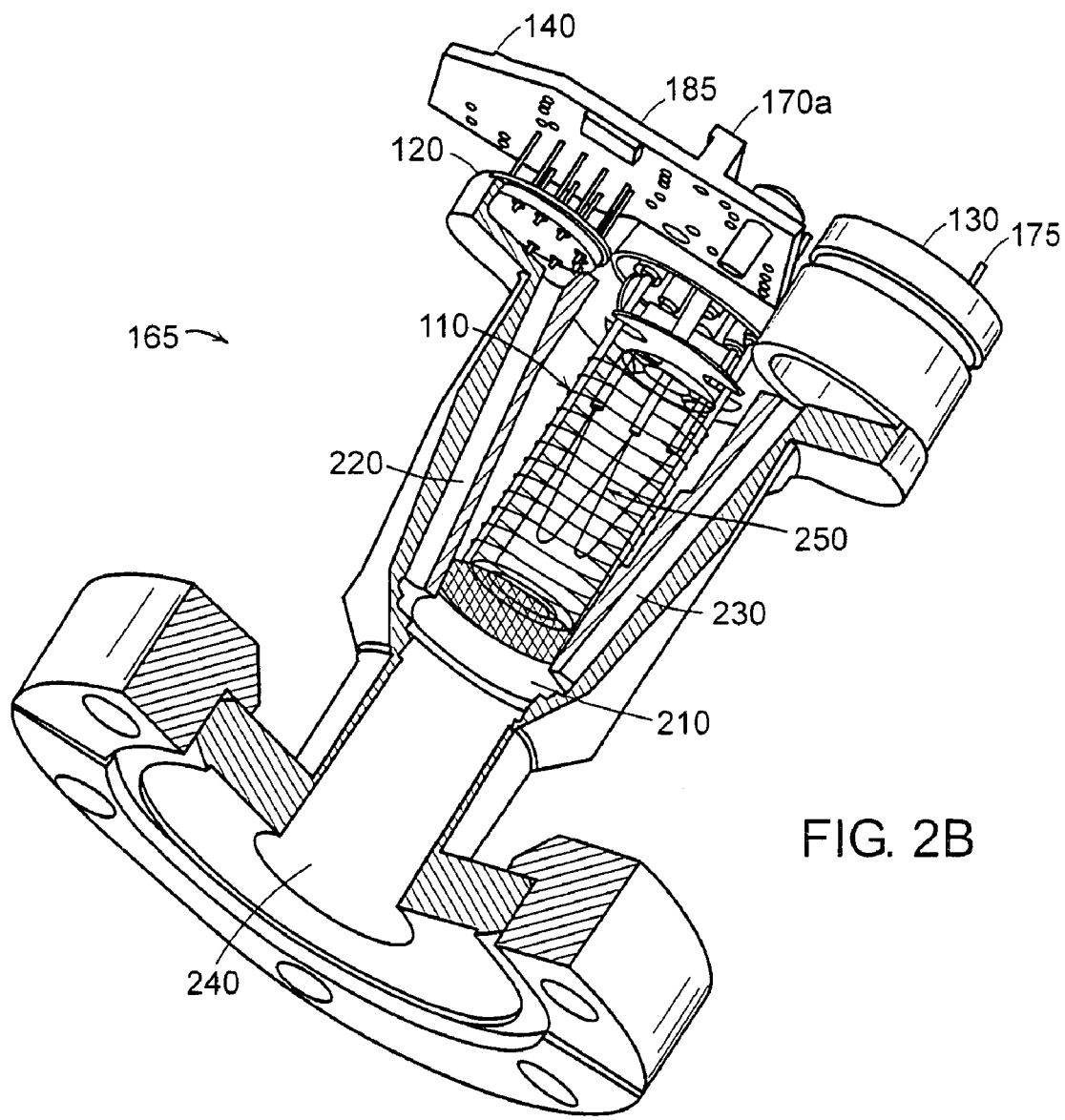
FIG. 2B is a sectional view of a combination vacuum gauge.

FIG. 2B illustrates a sectional view of the combination vacuum gauge 165. Each of the vacuum sensors 110-130 measures the vacuum of a vacuum system via a common gauge port 240. The ionization gauge 110, the heat-loss sensor 120, and the diaphragm sensor 130, each have access to the vacuum system through the ionization gauge port 210, the heat-loss sensor port 220, and the diaphragm sensor port 230, respectively.

As described in U.S. Pat. Ser. No. 6,658,941, the heat-loss sensor 120 is temperature compensated by mathematically combining the sensing element voltage (VS) and the sensing element current (IS) such that the resulting pressure measurement is independent of changes in temperature. In other words, the pressure measurement is calculated through the equation $PX=f(VS,IS)$ (a three-dimensional surface calculation). This equation is derived from paired values of VSC and ISC obtained by calibration methods for multiple known values of pressure PC and ambient temperature spread across the pressure and temperature ranges of interest, using three-dimensional curve fitting software.

A significant source of temperature variation in the combination vacuum gauge 165 is the heat generated by the ionization gauge filament 250. The ionization gauge 110 is in close proximity to the heat-loss sensor 120 and thus the heat-loss sensor 120 interacts thermally with the ionization gauge 110 in a way that is unique to each combination gauge assembly 165 because of the slight manufacturing tolerances, material variations, and thermal variations due to the different vacuum fittings. Moreover, since the assembly is hottest near the ionization gauge filament 250, there are temperature gradients that affect the heat-loss sensor temperature compensating equations.

The nonvolatile memory 140 may contain improved temperature compensating calibration parameters that account for the temperature gradients caused by the ionization gauge 110 and that are unique to each combination vacuum gauge 165. These calibration parameters may take the form of an algorithm. The calibration parameters are derived for each combination vacuum gauge 165 by taking a first set of calibration data for the heat-loss sensor 120, or another heat-sensitive sensor, when the ionization gauge 110 is turned on and by taking a second set of calibration data for the heat-loss sensor when the ionization gauge 110 is turned off. Although separate sets of calibration parameters corresponding to the on and off states may be stored, in a preferred system, the calibration data is mathematically combined using three-dimensional curve fitting software. Thus, a single calibration curve calibrates the heat-loss sensor whether the ionization gauge is on or off.

In a simple form, the calibration data is taken at two pressures corresponding to the extremes of the pressure measurement range of the heat-loss sensor with the ionization gauge in each of the on and off states.

Figure 3:
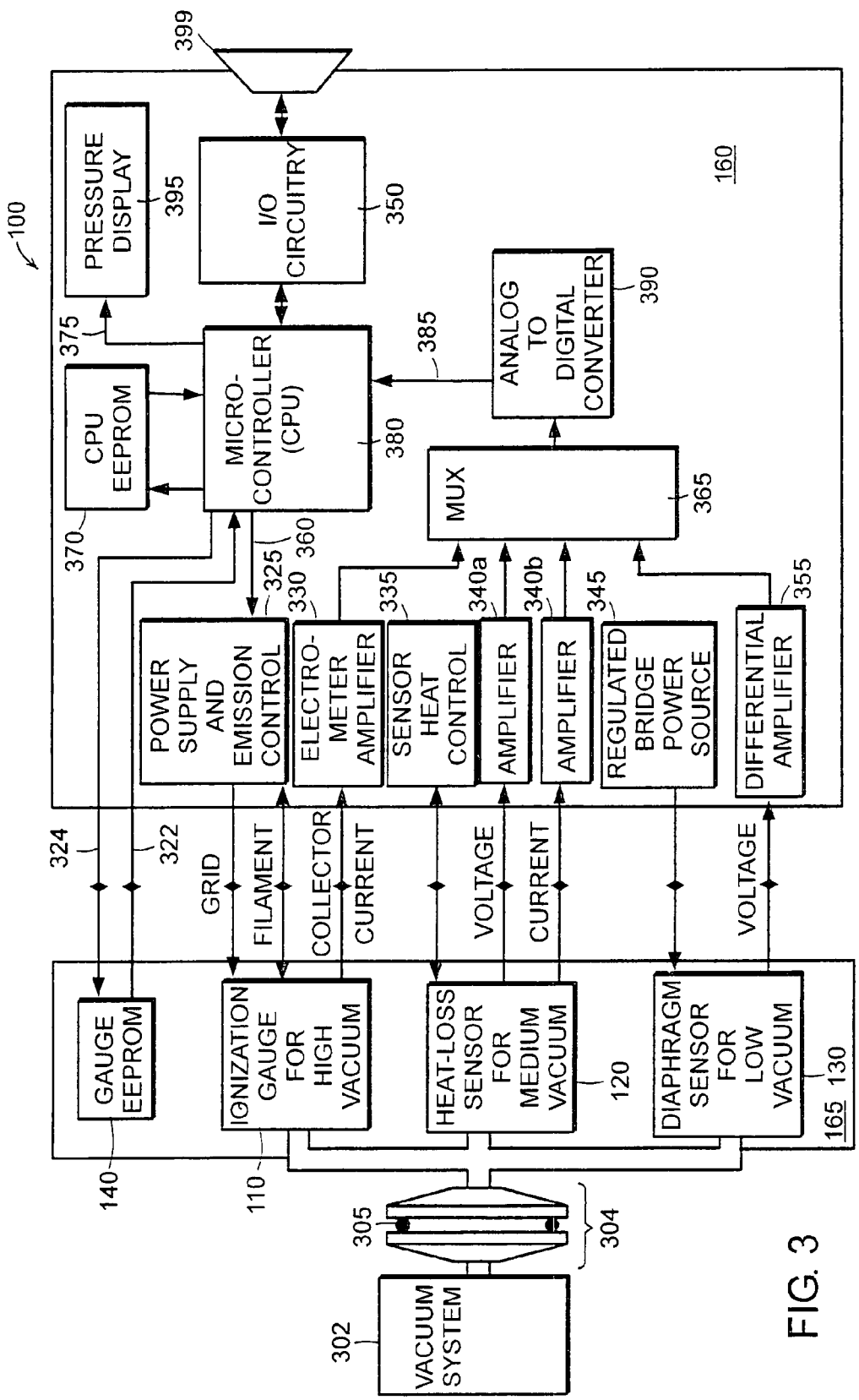
FIG. 3 is a block diagram of a combination vacuum gauge system.

Referring to FIG. 3, controller electronics 160 connect to the combination vacuum gauge 165 via pin and socket connections. The combination vacuum gauge 165 in turn connects to the vacuum system 302 through a vacuum port connection 304 which includes a vacuum seal 305. The combination vacuum gauge 165 is thus field replaceable in the event that the combination vacuum gauge 165 malfunctions or fails.

In operation of the combination vacuum gauge system 100, a power supply and emission control block 325 provides voltage to the grid and power to the filament of the ionization gauge 110 and controls the amount of filament emission current through a feedback mechanism. The collector current of the ionization gauge 110 is provided as an input to an electrometer amplifier 330.

A sensor heat control 335 controls the power input to the heat-loss sensor 120. The heat-loss sensor 120 provides voltage and current measurements as inputs to amplifiers 340*a* and 340*b*.

Finally, a regulated bridge power source 345 provides power to the diaphragm sensor 130. A voltage measurement output from the diaphragm sensor 130 is input to a differential amplifier 355.

Each of the amplifiers 330, 340*a*, 340*b*, and 355 provides measurement signals from the combination vacuum gauge 165 to a multiplexer 365. Outputs from the multiplexer 365 are converted into digital form via an analog to digital converter 390. These digital signals are then input to a microcontroller (CPU) 380 for processing.

A CPU EEPROM 370 connects to the CPU 380 to store, in particular, calibration parameters unique to the controller electronics 160. By having separate calibration parameters for the combination vacuum gauge 165 and the controller electronics 160, the combination vacuum gauge 165 and the controller electronics 160 are interchangeable (i.e., any combination vacuum gauge 165 may be connected to any controller electronics 160). Furthermore, the controller electronics 160 may be calibrated independently of the combination vacuum gauges 165.

The microcontroller 380 calculates the vacuum in the vacuum system 302 based on measurement data from the combination vacuum gauge 165. Specifically, the ionization gauge 110 collector current is converted by the CPU 380 into high vacuum measurements using calibration parameters stored in the gauge EEPROM 140. The heat-loss sensors 120 voltage and current data are converted by the microcontroller 380 into medium vacuum measurements using the temperature compensating calibration parameters stored in the gauge EEPROM 140. Finally, the diaphragm sensor 130 voltage output is converted to low vacuum measurements using the calibration parameters stored in the gauge EEPROM 140. Depending on the vacuum measurements from the vacuum system 302, the CPU 380 generates a vacuum measurement by choosing the vacuum measurements from the appropriate sensor or pair of sensors in a blended signal region. Also, when the vacuum in the vacuum system 302 goes into or out of the vacuum range of the ionization gauge 110, the CPU 380 sends a signal 360 to the power supply and emission control block 325 to turn the ionization gauge 110 on or off.

Figure 4:
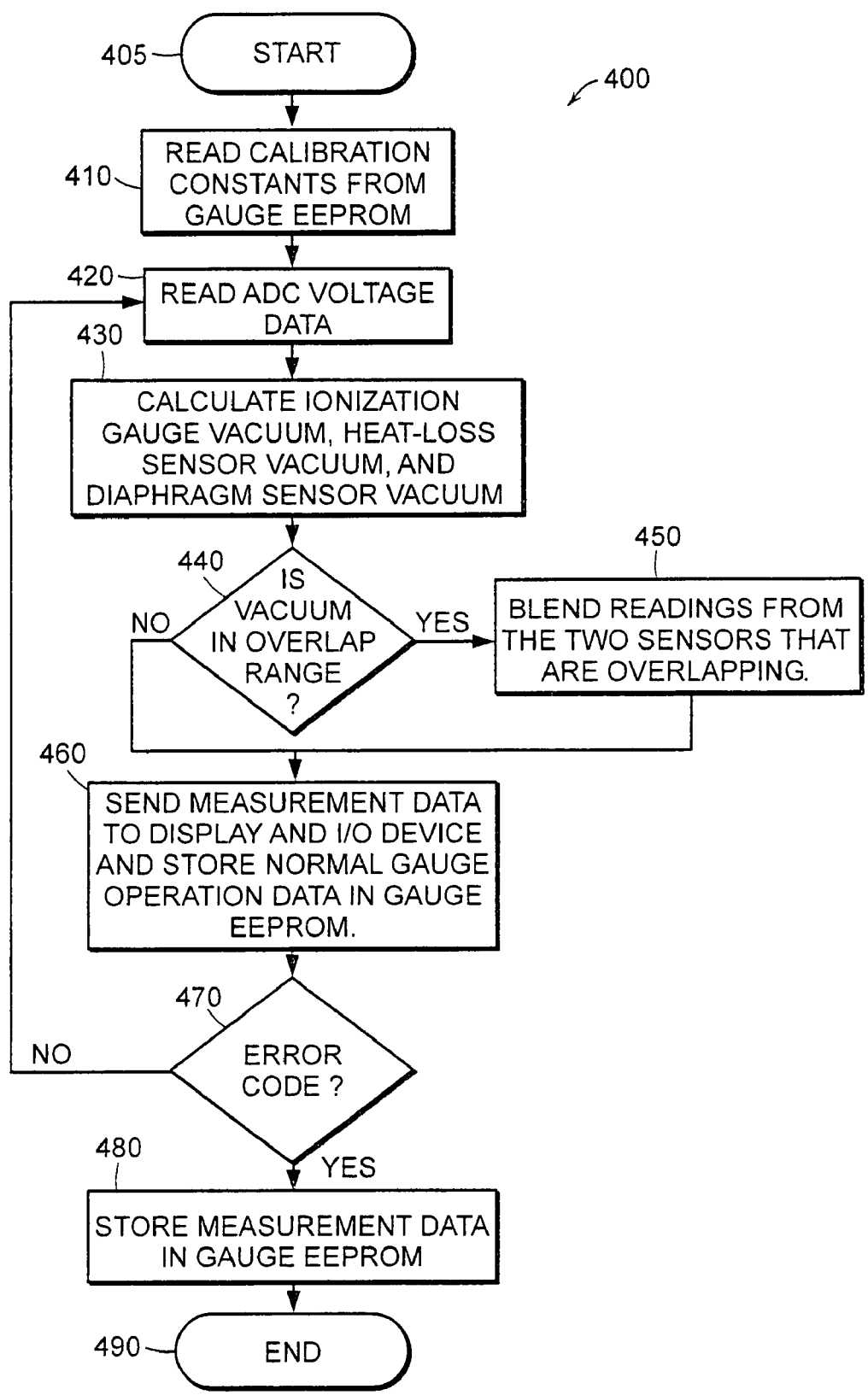
FIG. 4 is a flow chart showing the operation of a combination vacuum gauge system.

Referring to FIG. 4, a process 400, implemented by computer instructions executed on the CPU 380 of FIG. 3, converts raw sensor data (e.g. volts, amps, serial data) into vacuum data to be displayed on a pressure display 395 and to be output to an external device via input/output circuitry 350 and a user interface connector 399 of FIG. 3.

The process for measuring vacuum in a vacuum system 400 begins in step 405. In step 410, the CPU 380 reads the calibration parameters for the vacuum sensors, including the temperature compensating calibration parameters for the heat-loss sensors, from the gauge EEPROM 140. In step 420, the CPU 380 reads the analog to digital converter data signal 385 (FIG. 3). In step 430, the CPU 380 calculates the ionization gauge vacuum, the heat-loss sensor vacuum, and the diaphragm sensor vacuum. In step 440, if the vacuum measurement falls within an overlap range, then the measurements from the two sensors that are overlapping are blended in step 450. The blending is accomplished by calculating the weighted average of the measurements from the two sensors. In step 460, the blended signal measurement is sent to a display and to an input/output device. If the vacuum measurement data is not in the overlap range, then the vacuum measurements from the appropriate sensor are sent to a display and an input/output device in step 460. Also, in step 460, normal gauge operation data is updated in the gauge EEPROM 140 via line 322. Such data includes the following:

1. Electronics module serial number and firmware revision code.
2. Operating hours for each ionization gauge filament and for total combination vacuum gauge.
3. Total number of degas cycles for each ionization gauge filament.
4. Total number of power cycles for each ionization gauge filament.
5. Total number of power cycles for combination vacuum gauge.
6. Maximum internal temperature recorded.

As previously described, sometimes vacuum gauges malfunction or fail and the user returns the vacuum gauge to the manufacturer without any explanation as to the cause of malfunction or failure. This problem is addressed by providing nonvolatile memory 140 coupled to the vacuum gauge that stores measurement data of the vacuum sensors when an event occurs such as gauge failure or an out-of-bounds condition.

Figure 6B:
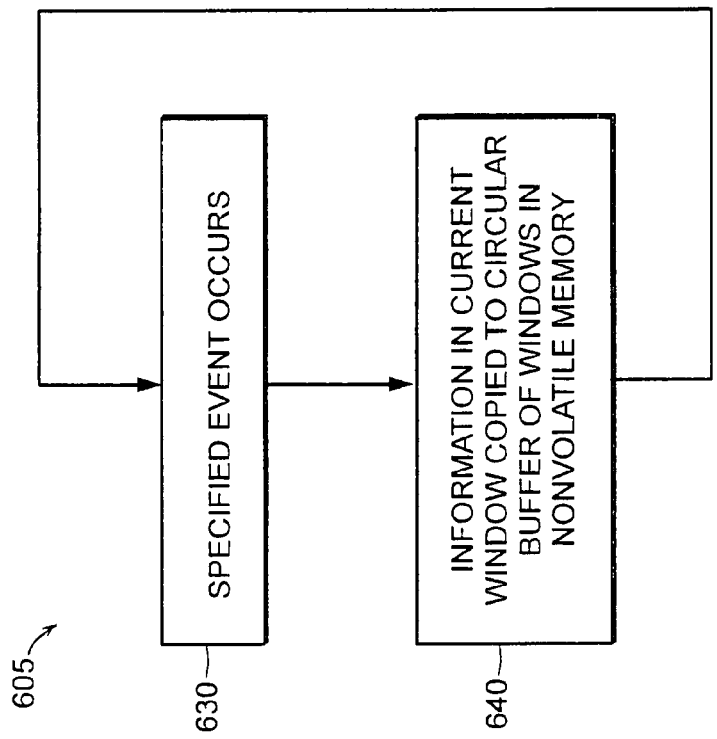
FIGS. 6A and 6B are flow charts showing the processes of writing data to the nonvolatile memory.
Figure 6A:
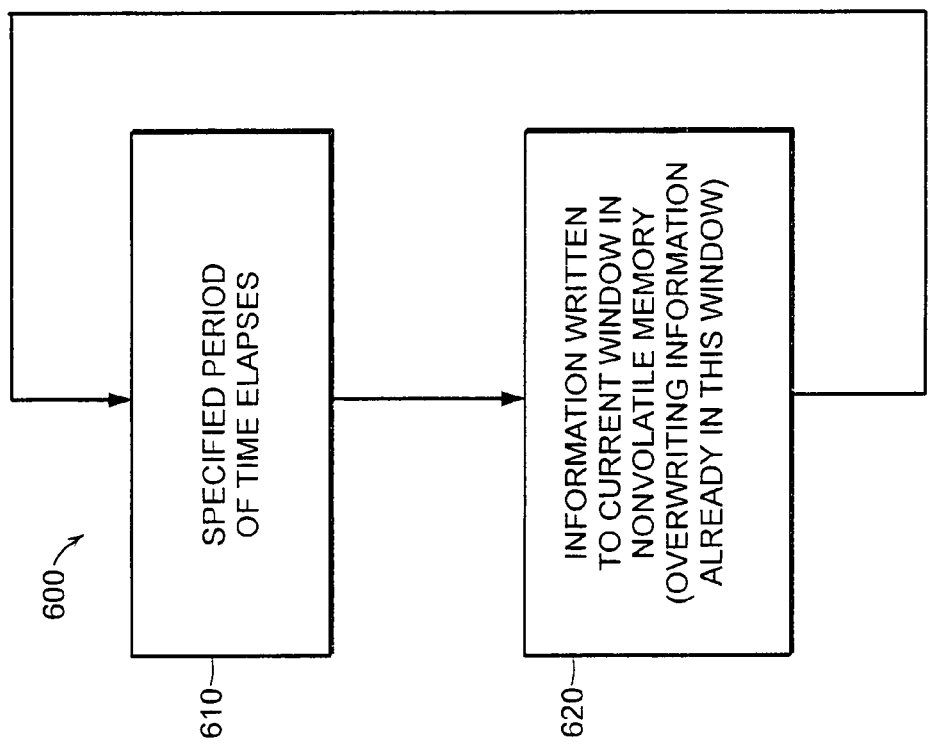

The measurement data may be stored in the nonvolatile memory 140 as illustrated in FIG. 5. Windows of measurement data may be stored in the nonvolatile memory at a location indicated by reference numeral 520. In particular, at predetermined time intervals, the CPU 380 writes measurement data to the nonvolatile memory 140 at the location current window 522. This simple process is illustrated in FIG. 6A as process 600. In step 610, the CPU 380 determines whether a specified period of time has elapsed. When the CPU 380 determines that a specified period of time has elapsed, the CPU 380 writes measurement data to current window 522, thereby overwriting measurement data that may already be written at this location. The process then returns to step 610 and determines whether a specified period of time has once again elapsed.

Referring again to FIG. 4, in step 470 the process 400 determines whether an error code has been generated indicating an error event. If an error code has not been generated, then the process returns to step 420. If an error code has been generated, then, in step 480, measurement data contained in current window 522 is copied into Window 1, Window 2, . . . , or Window n (524*a*, 524*b*, . . . , 524*x*) of a circular buffer of n windows 524 shown in FIG. 5. The measurement data includes the following:

1. Error code.
2. Heat-loss sensor raw data (Vs and Is) and vacuum indication.
3. Ionization gauge collector current, emission current, degas status, operating filament number, and vacuum reading.
4. Ionization gauge run time since last turn-on.
5. Internal electronics module temperature.
6. Diaphragm sensor voltage and vacuum reading.
7. Barometric pressure reading.

The circular buffer of n windows 524 permits the storage of multiple windows of measurement data in response to successive events. FIG. 6B depicts a process for storing multiple windows of measurement data 605 in the nonvolatile memory 140. If the process 605 determines in step 630 that a specified event has occurred, then, in step 640, the measurement data contained in the current window 522 is copied to Window 1 (524*a*). The process 605 then returns to step 630 to determine whether another specified event has occurred. If so, the measurement data contained in the current window 522 is copied to Window 2 (524*b*). The process 605 again returns to step 630 to determine whether another specified event has occurred. In this way, measurement data, updated at specified time intervals in the current window 522, is copied to successive windows (524a, 524b, . . . , 524x) in the circular buffer of n windows 524 in response to successive specified events.

Therefore, after the user returns the combination vacuum gauge 165 to the manufacturer, the manufacturer can use the data stored on the gauge EEPROM 140 to aid in determining the cause of gauge malfunction or failure.

In step 490, the process 400 ends.

While this invention has been particularly shown and described with references to preferred embodiments thereof, it will be understood by those skilled in the art that various changes in form and details may be made therein without departing from the scope of the invention encompassed by the appended claims.

The diaphragm sensor may be of the piezo-resistive type and it may measure absolute pressure (i.e., pressure deviation from atmospheric pressure) or differential pressure.

An error code may be generated when the voltage and current measurements in a heat-loss sensor go outside their physical ranges. An error code may also be generated when there is a gross anomaly in the ion current of the ionization gauge.

The nonvolatile memory coupled to the vacuum sensors of the combination vacuum gauge may be integral to either the combination vacuum gauge or the controller electronics.

What is claimed is:

1. An apparatus for measuring gas pressure in an environment comprising, in a gauge assembly:
   a vacuum gauge;
   nonvolatile memory coupled to the vacuum gauge for later gauge analysis; and
   a processor that responds to an error event to store, in the nonvolatile memory, noncalibration measurement data, sensed by the vacuum gauge, to be available for analysis after failure of the gauge.

2. The apparatus according to claim 1, wherein the nonvolatile memory is integral to the vacuum gauge.

3. The apparatus according to claim 1, wherein the nonvolatile memory is updated at predetermined time intervals.

4. The apparatus according to claim 3, wherein a window of measurement data is stored in the nonvolatile memory.

5. The apparatus according to claim 1, wherein a window of measurement data is stored in the nonvolatile memory.

6. The apparatus according to claim 1, wherein the vacuum gauge comprises an ionization gauge, a heat-loss sensor, and a diaphragm sensor.

7. The apparatus according to claim 1, wherein the vacuum gauge includes an ionization gauge and the measurement data of the ionization gauge includes filament emission current and ion current.

8. The apparatus according to claim 1, wherein the vacuum gauge includes a heat-loss sensor and the measurement data of the heat-loss sensor includes sensed electrical parameters of a heat-loss sensor.

9. The apparatus according to claim 1, wherein the vacuum gauge includes a diaphragm sensor and the measurement data of the diaphragm sensor includes an output from an electronic circuit of the diaphragm sensor.

10. A method for measuring gas pressure in an environment comprising the steps of:
    providing a vacuum gauge;
    providing nonvolatile memory coupled to the vacuum gauge; and
    storing noncalibration measurement data sensed by the vacuum gauge during operation in the nonvolatile memory for later gauge analysis after failure.

11. The method according to claim 10, wherein the nonvolatile memory is integral to the vacuum gauge.

12. The method according to claim 10, wherein the nonvolatile memory is updated at predetermined time intervals.

13. The method according to claim 12, wherein a window of measurement data is stored in the nonvolatile memory.

14. The method according to claim 10, wherein the nonvolatile memory is updated in response to an event.

15. The method according to claim 14, wherein a window of measurement data is stored in the nonvolatile memory.

16. The method according to claim 14, wherein the event is an error.

17. The method according to claim 10, wherein the vacuum gauge comprises an ionization gauge, a heat-loss sensor, and a diaphragm sensor.

18. The method according to claim 10, wherein the vacuum gauge includes an ionization gauge and the measurement data of the ionization gauge includes filament emission current and ion current.

19. The method according to claim 10, wherein the vacuum gauge includes a heat sensor and the measurement data of the heat-loss sensor includes sensed electrical parameters of the heat-loss sensor.

20. The method according to claim 10, wherein the vacuum gauge includes a diaphragm sensor and the measurement data of the diaphragm sensor includes an output from an electronic circuit of the diaphragm sensor.

21. A method for measuring gas pressure in an environment comprising the steps of:
    providing a vacuum gauge assembly comprising:
      a vacuum gauge;
      nonvolatile memory coupled to the vacuum gauge; and
      a processor that stores measurement data sensed by the vacuum gauge in
    the nonvolatile memory; and
    after failure of the vacuum gauge, analyzing stored measurement data.

22. The method according to claim 21, wherein the nonvolatile memory is integral to the vacuum gauge.

23. The method according to claim 21, wherein the nonvolatile memory is updated at predetermined time intervals.

24. The method according to claim 23, wherein a window of measurement data is stored in the nonvolatile memory.

25. The method according to claim 21, wherein the nonvolatile memory is updated in response to an event.

26. The method according to claim 25, wherein a window of measurement data is stored in the nonvolatile memory.

27. The method according to claim 25, wherein the event is an error.

28. The method according to claim 21, wherein the vacuum gauge comprises an ionization gauge, a heat-loss sensor, and a diaphragm sensor.

29. The method according to claim 21, wherein the vacuum gauge includes an ionization gauge and the measurement data of the ionization gauge includes filament emission current and ion current.

30. An apparatus for measuring gas pressure in an environment comprising:
    a vacuum gauge comprising an ionization gauge, a heat-loss sensor, and a diaphragm sensor; and
    nonvolatile memory coupled to the vacuum gauge for later gauge analysis, the nonvolatile memory storing measurement data of the vacuum gauge.

* * * * *